united States Patent
Fiorani et al.

(10) Patent No.: US 12,004,002 B2
(45) Date of Patent: Jun. 4, 2024

(54) HANDLING SERVICE DATA APPLICATION PROTOCOL (SDApP) END MARKERS AT HANDOVER

(71) Applicant: TELEFONAKTIEBOLAGET LM ERICSSON (PUBL), Stockholm (SE)

(72) Inventors: Matteo Fiorani, Solna (SE); Alexander Vesely, Feldbach (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 17/289,556

(22) PCT Filed: Nov. 1, 2019

(86) PCT No.: PCT/IB2019/059396
§ 371 (c)(1),
(2) Date: Apr. 28, 2021

(87) PCT Pub. No.: WO2020/089849
PCT Pub. Date: May 7, 2020

(65) Prior Publication Data
US 2021/0400521 A1 Dec. 23, 2021

Related U.S. Application Data

(60) Provisional application No. 62/754,949, filed on Nov. 2, 2018.

(51) Int. Cl.
*H04W 28/10* (2009.01)
*H04W 28/02* (2009.01)
(Continued)

(52) U.S. Cl.
CPC ... *H04W 28/0263* (2013.01); *H04W 28/0268* (2013.01); *H04W 28/06* (2013.01); *H04W 28/10* (2013.01); *H04W 76/15* (2018.02)

(58) Field of Classification Search
CPC ......... H04W 28/0263; H04W 28/0268; H04W 28/06; H04W 28/10; H04W 76/15; H04W 36/0044; H04W 36/0005
See application file for complete search history.

(56) References Cited

U.S. PATENT DOCUMENTS

2016/0057663 A1* 2/2016 Teyeb ............. H04W 36/00692
455/436
2016/0337914 A1* 11/2016 Hoffmann ......... H04W 36/0083
(Continued)

FOREIGN PATENT DOCUMENTS

CN 108282817 A 7/2018
CN 108390830 A 8/2018

OTHER PUBLICATIONS

ETSI TS 138 423 V15.1.0 (Sep. 2018) 5G; NG-RAN; Xn Application Protocol (XnAP) (3GPP TS 38.423 version 15.1.0 Release 15) (Year: 2018).*
(Continued)

*Primary Examiner* — Edan Orgad
*Assistant Examiner* — Malick A Sohrab

(57) ABSTRACT

Methods performed by base stations and wireless devices in networks are disclosed. A method performed by a base station comprises: initiating a QoS-flow to DRB remapping; informing a target base station that the remapping is ongoing; and providing the target base station an old and a new QoS-flow to DRB mapping, wherein the old mapping was in place before the remapping, and the new mapping will be in place after the remapping. Another method performed by a base station comprises: receiving an indication from a further base station that QoS-flow to DRB remapping is ongoing; receiving an old and a new QoS-flow to DRB mapping from the further base station; and receiving signals from a wireless device using the old and new QoS-flow to DRB mappings. A method performed by the wireless device
(Continued)

comprises: sending data packets using a first QoS-flow to DRB mapping; receiving a new mapping; and sending an SOAR end marker, indicating that the wireless device is applying the new mapping. Also disclosed are base stations and wireless devices configured to perform the methods.

11 Claims, 13 Drawing Sheets

(51) Int. Cl.
*H04W 28/06* (2009.01)
*H04W 76/15* (2018.01)

(56) References Cited

U.S. PATENT DOCUMENTS

| | | | |
|---|---|---|---|
| 2017/0273074 | A1 | 9/2017 | Park |
| 2018/0213540 | A1 | 7/2018 | Chiu |
| 2019/0274063 | A1* | 9/2019 | Na ................ H04W 28/0257 |
| 2019/0349805 | A1* | 11/2019 | Cheng ............ H04W 28/0263 |
| 2020/0295902 | A1* | 9/2020 | You ................ H04W 36/0069 |
| 2021/0219191 | A1* | 7/2021 | Hu ................ H04W 36/0033 |
| 2022/0038941 | A1* | 2/2022 | Han ................ H04W 76/15 |
| 2022/0150749 | A1* | 5/2022 | Ke ................ H04W 76/12 |

OTHER PUBLICATIONS

3GPP TSG-RAN3 Meeting#101-bis Chengdu, China Oct. 8-12, 2018—R3-185817 (Year: 2018).*

Ericsson: "Support of SOAP mobility when re-mapping at source side is not yet finalised", 3GPP Draft; R3-190712, 3rd Generation Partnership Project (3GPP), Mobile Competence Centre; 650, Route Des Lucioles; F-06921 Sophia-Antipolis Cedex; France, vol. RAN WG3, No. Athens, Greece; Feb. 25, 2019-Mar. 1, 2019 Feb. 16, 2019 (Feb. 16, 2019), XP051604648, Retrieved from the Internet: URL:http://www.3gpp.org/ftp/tsg%5Fran/WG3%5Flu/TSGR3%5F103/Docs/ R3%2D190712%2Ezip [retrieved on Feb. 16, 2019).

3GPP TS 38.300 V15.3.1 (Oct. 2018), 3rd Generation Partnership Project; Technical Specification Group Radio Access Network; NR; NR and NG-RAN Overall Description; Stage 2 Release 15).

3GPP TS 38.423 v15.1.0.

3GPP TSG-RAN WG2-#101, Feb. 26-Mar. 2, 2018, "DC Based NR Scheme for 0ms Interruption Handover" R2-1802473.

Nokia, R2-1817691 Non-split bearer solution for reducing the service interruption time in HO, Spokane, US, Nov. 12-16, 2018.

Huawei: "Discussion on data forwarding and QoS flow remapping", 3GPP Draft; R3-185817, 3rd Generation Partnership Project (3GPP), Mobile Competence Centre; 650, Route Des Lucioles; F-06921 Sophia-Antipolis Cedex; France, vol. RAN WG3, No. ChenQdu, China; Oct. 8, 2018-Oct. 12, 2018 Sep. 29, 2018 (Sep. 29, 2018), XP051529086, Retrieved from the Internet: URL:http://www.3gpp.org/ftp/tsg%5Fran/WG3%5Flu/TSGR3%5F101 bis/ Docs/R3%2D185817%2Ezip [retrieved on Sep. 29, 2018].

ZTE: "Data Forwarding and In Sequence Lossless Delivery during HO", 3GPP Draft; R3-173483 Data Forwarding and in Sequence Lossless Delivery During HO, 3rd Generation Partnership Project f3GPP1 Mobile Competence Centre · 650 Route Des Lucioles · F-06921 Sophia-Antipo vol. RAN WG3, No. Prague, Czech Republic; Oct. 9, 2017-Oct. 13, 2017 Oct. 9, 2017 (Oct. 9, 2017), XP051343911, URL:http://www.3gpp.org/ftp/Meetings_3GPP_SYNC/RAN3/Docs/ [retrieved on Oct. 9, 2017].

* cited by examiner

HANDLING SERVICE DATA APPLICATION PROTOCOL (SDApP) END MARKERS AT HANDOVER

This application is a 371 of International Application No. PCT/IB2019/059396, filed Nov. 1, 2019, which claims the benefit of U.S. Provisional Application No. 62/754,949, filed Nov. 2, 2018, the disclosures of which are fully incorporated herein by reference.

TECHNICAL FIELD

Embodiments of the present disclosure relate to methods and apparatus in networks, and particularly methods and apparatus for handovers between base stations in networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Mobility in RRC-Connected in NG-RAN

Network controlled mobility applies to UEs in RRC_CONNECTED and is categorized into two types of mobility: cell level mobility and beam level mobility. Cell Level Mobility requires explicit RRC signalling to be triggered, i.e., handover. For inter-gNB handover, the signalling procedures consist of at least the following elemental components illustrated in FIG. 1, wherein the numbering of the steps is as shown in FIG. 1:

1. The source gNB initiates handover and issues a Handover Request over the Xn interface.
2. The target gNB performs admission control and provides the RRC configuration as part of the Handover Acknowledgement.
3. The source gNB provides the RRC configuration to the UE in the Handover Command. The Handover Command message includes at least cell ID and all information required to access the target cell so that the UE can access the target cell without reading system information. For some cases, the information required for contention-based and contention-free random access can be included in the Handover Command message. The access information to the target cell may include beam specific information, if any.
4. The UE moves the RRC connection to the target gNB and replies the Handover Complete.

The handover mechanism triggered by RRC requires the UE at least to reset the MAC entity and re-establish RLC. RRC managed handovers with and without PDCP entity re-establishment are both supported. For DRBs using RLC AM mode, PDCP can either be re-established together with a security key change or initiate a data recovery procedure without a key change. For DRBs using RLC UM mode and for SRBs, PDCP can either be re-established together with a security key change or remain as it is without a key change.

Data forwarding, in-sequence delivery and duplication avoidance at handover can be guaranteed when the target gNB uses the same DRB configuration as the source gNB. Timer based handover failure procedure is supported in NR. RRC connection re-establishment procedure is used for recovering from handover failure.

Beam Level Mobility does not require explicit RRC signalling to be triggered. The gNB provides via RRC signalling the UE with measurement configuration containing configurations of SSB/CSI resources and resource sets, reports and trigger states for triggering channel and interference measurements and reports. Beam Level Mobility is then dealt with at lower layers by means of physical layer and MAC layer control signalling, and RRC is not required to know which beam is being used at a given point in time.

Handover: C-Plane Handling

The intra-NR RAN handover performs the preparation and execution phase of the handover procedure performed without involvement of the 5GC, i.e. preparation messages are directly exchanged between the gNBs. The release of the resources at the source gNB during the handover completion phase is triggered by the target gNB. FIG. 2 depicts the basic handover scenario where neither the AMF nor the UPF changes, wherein the numbering of the steps is as shown in FIG. 2:

0. The UE context within the source gNB contains information regarding roaming and access restrictions which were provided either at connection establishment or at the last TA update.
1. The source gNB configures the UE measurement procedures and the UE reports according to the measurement configuration.
2. The source gNB decides to handover the UE, based on MeasurementReport and RRM information.
3. The source gNB issues a Handover Request message to the target gNB passing a transparent RRC container with necessary information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the minimum system information from source gNB, the UE capabilities for different RATs, PDU session related information, and can include the UE reported measurement information including beam-related information if available. The PDU session related information includes the slice information (if supported) and QoS flow level QoS profile(s).
4. Admission Control may be performed by the target gNB. Slice-aware admission control shall be performed if the slice information is sent to the target gNB. If the PDU sessions are associated with non-supported slices the target gNB shall reject such PDU Sessions.
5. The target gNB prepares the handover with L1/L2 and sends the HANDOVER REQUEST ACKNOWLEDGE to the source gNB, which includes a transparent container to be sent to the UE as an RRC message to perform the handover.
6. The source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and target cell SIBs, etc.

7. The source gNB sends the SN STATUS TRANSFER message to the target gNB.
8. The UE synchronises to the target cell and completes the RRC handover procedure by sending RRCReconfigurationComplete message to target gNB.
9. The target gNB sends a PATH SWITCH REQUEST message to AMF to trigger 5GC to switch the DL data path towards the target gNB and to establish an NG-C interface instance towards the target gNB.
10. 5GC switches the DL data path towards the target gNB. The UPF sends one or more "end marker" packets on the old path to the source gNB per PDU session/tunnel and then can release any U-plane/TNL resources towards the source gNB.
11. The AMF confirms the PATH SWITCH REQUEST message with the PATH SWITCH REQUEST ACKNOWLEDGE message.
12. Upon reception of the PATH SWITCH REQUEST ACKNOWLEDGE message from the AMF, the target gNB sends the UE CONTEXT RELEASE to inform the source gNB about the success of the handover. The source gNB can then release radio and C-plane related resources associated to the UE context. Any ongoing data forwarding may continue.

The RRM configuration can include both beam measurement information (for layer 3 mobility) associated to SSB(s) and CSI-RS(s) for the reported cell(s) if both types of measurements are available. Also, if CA is configured, the RRM configuration can include the list of best cells on each frequency for which measurement information is available. And the RRM measurement information can also include the beam measurement for the listed cells that belong to the target gNB.

The common RACH configuration for beams in the target cell is only associated to the SSB(s). The network can have dedicated RACH configurations associated to the SSB(s) and/or have dedicated RACH configurations associated to CSI-RS(s) within a cell. The target gNB can only include one of the following RACH configurations in the Handover Command to enable the UE to access the target cell:
  i) Common RACH configuration;
  ii) Common RACH configuration+Dedicated RACH configuration associated with SSB;
  iii) Common RACH configuration+Dedicated RACH configuration associated with CSI-RS.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

U-Plane Handling

The U-plane handling during the Intra-NR-Access mobility activity for UEs in RRC_CONNECTED takes the following principles into account to avoid data loss during HO:
  During HO preparation U-plane tunnels can be established between the source gNB and the target gNB;
  During HO execution, user data can be forwarded from the source gNB to the target gNB.
    Forwarding should take place in order as long as packets are received at the source gNB from the UPF or the source gNB buffer has not been emptied.
  During HO completion:
    The target gNB sends a path switch request message to the AMF to inform that the UE has gained access and the AMF then triggers path switch related 5GC internal signalling and actual path switch of the source gNB to the target gNB in UPF;
    The source gNB should continue forwarding data as long as packets are received at the source gNB from the UPF or the source gNB buffer has not been emptied.

For RLC-AM Bearers:
For in-sequence delivery and duplication avoidance, PDCP SN is maintained on a per DRB basis and the source gNB informs the target gNB about the next DL PDCP SN to allocate to a packet which does not have a PDCP sequence number yet (either from source gNB or from the UPF).

For security synchronisation, HFN is also maintained and the source gNB provides to the target one reference HFN for the UL and one for the DL i.e. HFN and corresponding SN In both the UE and the target gNB, a window-based mechanism is used for duplication detection and reordering.

The occurrence of duplicates over the air interface in the target gNB is minimised by means of PDCP SN based reporting at the target gNB by the UE. In uplink, the reporting is optionally configured on a per DRB basis by the gNB and the UE should first start by transmitting those reports when granted resources are in the target gNB. In downlink, the gNB is free to decide when and for which bearers a report is sent and the UE does not wait for the report to resume uplink transmission.

The target gNB re-transmits and prioritizes all downlink data forwarded by the source gNB (i.e. the target gNB should first send all forwarded PDCP SDUs with PDCP SNs, then all forwarded downlink SDAP SDUs before sending new data from 5GC), excluding PDCP SDUs for which the reception was acknowledged through PDCP SN based reporting by the UE.

NOTE: Lossless delivery when a QoS flow is mapped to a different DRB at handover, requires the old DRB to be configured in the target cell. For in-order delivery in the DL, the target gNB should first transmit the forwarded PDCP SDUs on the old DRB before transmitting new data from 5GCN on the new DRB. In the UL, the target gNB should not deliver data of the QoS flow from the new DRB to 5GCN before receiving the end marker on the old DRB from the UE.

The UE re-transmits in the target gNB all uplink PDCP SDUs starting from the oldest PDCP SDU that has not been acknowledged at RLC in the source, excluding PDCP SDUs for which the reception was acknowledged through PDCP SN based reporting by the target.

For RLC-UM Bearers:
The PDCP SN and HFN are reset in the target gNB;
No PDCP SDUs are retransmitted in the target gNB;
The target gNB prioritises all downlink SDAP SDUs forwarded by the source gNB over the data from the core network;
NOTE: To minimize losses when a QoS flow is mapped to a different DRB at handover, the old DRB needs to be configured in the target cell. For in-order delivery in the DL, the target gNB should first transmit the forwarded PDCP SDUs on the old DRB before transmitting new data from 5GCN on the new DRB. In the UL, the target gNB should not deliver data of the QoS flow from the new DRB to 5GCN before receiving the end marker on the old DRB from the UE.

The UE does not retransmit any PDCP SDU in the target cell for which transmission had been completed in the source cell.

Data Forwarding

The following description depicts the data forwarding principles for intra-system handover. The source NG-RAN node may suggest downlink data forwarding per QoS flow established for a PDU session and may provide information how it maps QoS flows to DRBs. The target NG-RAN node decides data forwarding per QoS flow established for a PDU Session. If "lossless handover" is required and the target NG-RAN node applies the same QoS flows to DRB mapping for a DRB and if all QoS flows mapped to that DRB are accepted for data forwarding, the target NG-RAN node establishes a downlink forwarding tunnel for that DRB. For a DRB for which preservation of SN status applies, the target NG-RAN node may decide to establish an UL data forwarding tunnel. The target NG-RAN node may also decide to establish a downlink forwarding tunnel for each PDU session. In this case the target NG-RAN node provides information for which QoS flows data forwarding has been accepted and corresponding UP TNL information for data forwarding tunnels to be established between the source NG-RAN node and the target NG-RAN node. As long as data forwarding of DL user data packets takes place, the source NG-RAN node shall forward user data in the same forwarding tunnel, i.e.

for any QoS flow accepted for data forwarding by the target NG-RAN node and for which a DRB DL forwarding tunnel was established for a DRB to which this QoS flow was mapped at the source NG-RAN node, any fresh packets of this QoS flow shall be forwarded as PDCP SDUs via the mapped DRB DL forwarding tunnel.

for DRBs for which preservation of SN status applies, the source NG-RAN node may forward in order to the target NG-RAN node via the DRB DL forwarding tunnel all downlink PDCP SDUs with their SN corresponding to PDCP PDUs which have not been acknowledged by the UE.

for DRBs for which preservation of SN status applies the source NG-RAN node either:

discards the uplink PDCP PDUs received out of sequence if the source NG-RAN node has not accepted the request from the target NG-RAN node for uplink forwarding or if the target NG-RAN node has not requested uplink forwarding for the bearer during the Handover Preparation procedure; or forwards to the target NG-RAN node the uplink PDCP PDUs received out of sequence if the source NG-RAN node has accepted the request from the target NG-RAN node for uplink forwarding for the bearer during the Handover Preparation procedure.

Handling of End Marker Packets:

The source NG-RAN node receives one or several GTP-U end marker packets per PDU session from the UPF and replicates the end marker packets into each data forwarding tunnel when no more user data packets are to be forwarded over that tunnel.

End marker packets sent via a data forwarding tunnel are applicable to all QoS flows forwarded via that tunnel. After end marker packets have been received over a forwarding tunnel, the target NG-RAN node can start taking into account the packets of QoS flows associated with that forwarding tunnel received at the target NG-RAN node from the NG-U PDU session tunnel.

There currently exist certain challenges. In known handover systems, a problem may arise in case that the QoS-flow to DRB mapping is changed in the source NG-RAN node just before the handover procedure is initiated. In this case, it is possible that the remapping in the source NG-RAN node is ongoing while the handover preparation is performed.

Let us consider the following scenarios, as depicted in FIG. 3:

The source NG-RAN node decides to change the QoS flow to DRB mapping and re-configures the UE (for UL) and re-maps QoS flows in DL for DRBs for which duplication avoidance and re-ordering shall be supported. FIG. 3 shows scenarios with 3 DRBs in UL and DL, before data forwarding is started:

DRB1 DL: At HO, packets according to the old mapping are still in transmission process and in the buffer, packets according to the new mapping have already PDCP SNs assigned.

DRB2 DL: At HO, all packets according to the old mapping have been submitted, packets according to the new mapping have already PDCP SNs assigned.

DRB3 DL: At HO, all packets according to the old mapping and already packets according to the new mapping have been submitted, packets according to the new mapping have already PDCP SNs assigned.

DRB1 UL: At HO, all packets according to the old mapping have been submitted, transmission along the new mapping is ongoing. The UE has sent an SDAP end marker (per QFI removed from the DRB) to indicate that it applies the new mapping.

DRB2 UL: At HO, all packets according to the old mapping have been submitted. Either, the UE sent already the SDAP end marker (per QFI removed from the DRB) on the old side, or it will do so on the new side.

DRB3 UL: At HO, submission of packets along the old mapping is still ongoing.

Current handover systems do not provide support for any of the above scenarios.

3GPP TS 38.423 v 15.1.0 discloses radio network layer signalling procedures of the control plane between NG-RAN nodes in NG-RAN. XnAP supports the functions of the Xn interface using signalling procedures defined in the document.

3GPP TS 38.413 v 15.1.0 discloses the radio network layer signalling protocol for the NG interface. The NG Application Protocol (NGAP) supports the functions of the NG interface by signalling procedures defined in the document.

SUMMARY

It is an object of the present disclosure to support base station handover during QoS-flow to DRB remapping procedures, including handovers between NG-RAN nodes and context transfers between NG-RAN nodes in dual connectivity.

Embodiments of the disclosure aim to provide apparatus and methods that alleviate some or all of the issues identified.

An aspect of an embodiment of the disclosure provides a method performed by a wireless device, the method comprising: sending data packets using a first Quality of Service-flow, QoS-flow, to Data Radio Bearer, DRB, mapping; receiving a new mapping; and sending a Service Data Application Protocol, SDAP, end marker, indicating that the wireless device is applying the new mapping.

A further aspect of an embodiment of the disclosure provides A method performed by a base station, the method comprising: initiating a QoS-flow to DRB remapping; informing a target base station that the remapping is ongoing; and providing the target base station an old and a new QoS-flow to DRB mapping, wherein the old mapping was in place before the remapping, and the new mapping will be in place after the remapping.

A still further aspect of an embodiment of the disclosure provides a method performed by a base station, the method comprising: receiving an indication from a further base station that QoS-flow to Data Radio Bearer, DRB, remapping is ongoing; receiving an old and a new QoS-flow to DRB mapping from the further base station; and receiving signals from a wireless device using the old and new QoS-flow to DRB mappings.

Additional aspects of embodiments provide base stations and wireless devices configured to perform methods as set out herein.

BRIEF DESCRIPTION OF DRAWINGS

For a better understanding of the present disclosure, and to show how it may be put into effect, reference will now be made, by way of example only, to the accompanying drawings, in which.

DETAILED DESCRIPTION

Certain aspects of the present disclosure and their embodiments may provide solutions to these or other challenges. Specifically, this disclosure presents a solution for the scenario described above.

In some aspects of embodiments, the following features may be present:

Downlink handling:
  In DL, data forwarding will take place with packets along the source side old and the new mapping. Even if the target side decides for re-mapping again, the target side will submit packets from DRB-level forwarding tunnels to the existing DRBs until the GTP-U DL end marker is received via that forwarding tunnel. The only information the target side would need is the new (latest) mapping information from the source side
  For the handling of DL data, if re-mapping on the source side is still not finished when HO (in general: SDAP relocation to another NG-RAN node) is triggered, source side mapping information is provided to the target node along the latest mapping decision of the source NG-RAN node. There is no impact to existing specifications.

Figure 1:
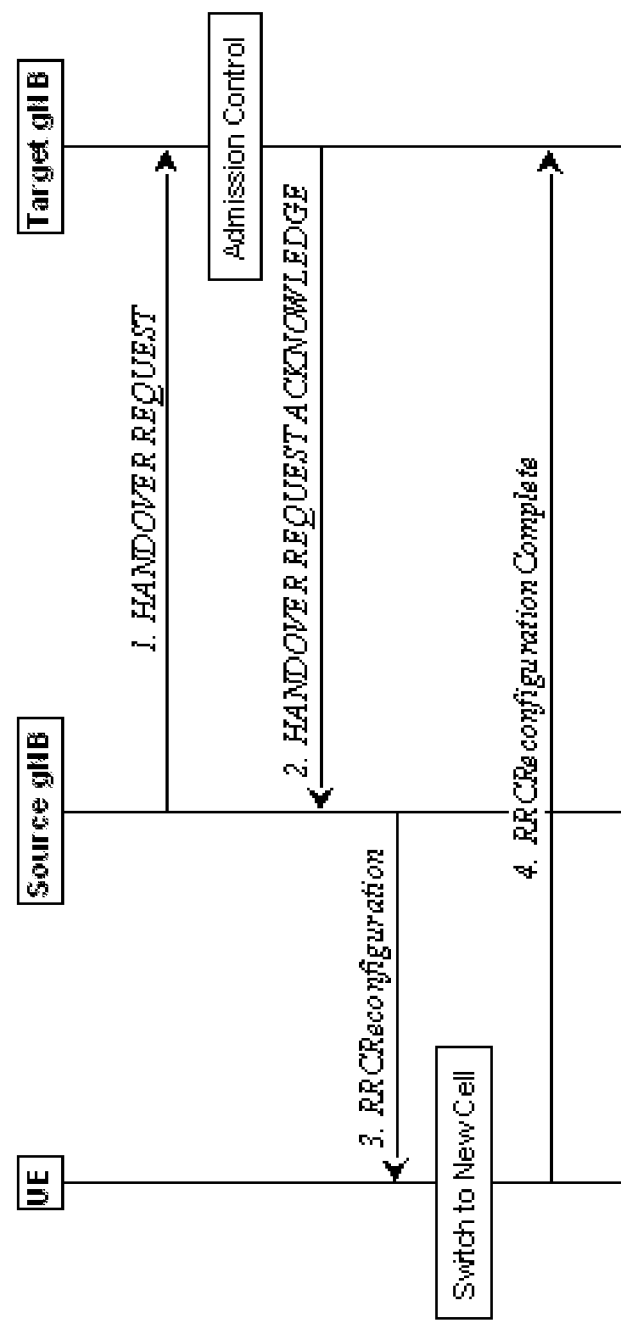
FIG. 1 is a signalling diagram of an Inter-gNB handover procedure.
Figure 2:
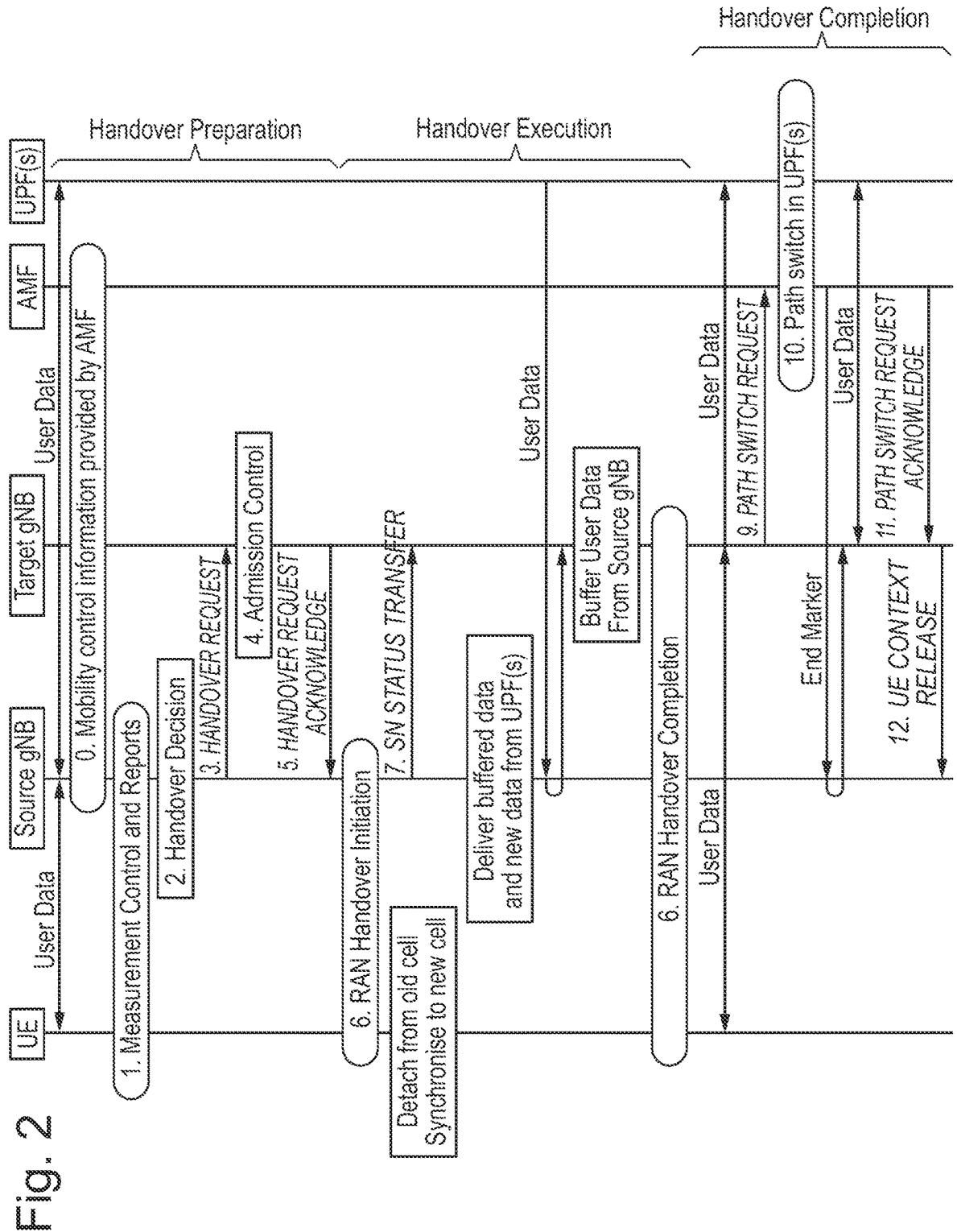
FIG. 2 is a signalling diagram of an Intra-AMF/UPF handover procedure.
Figure 3:
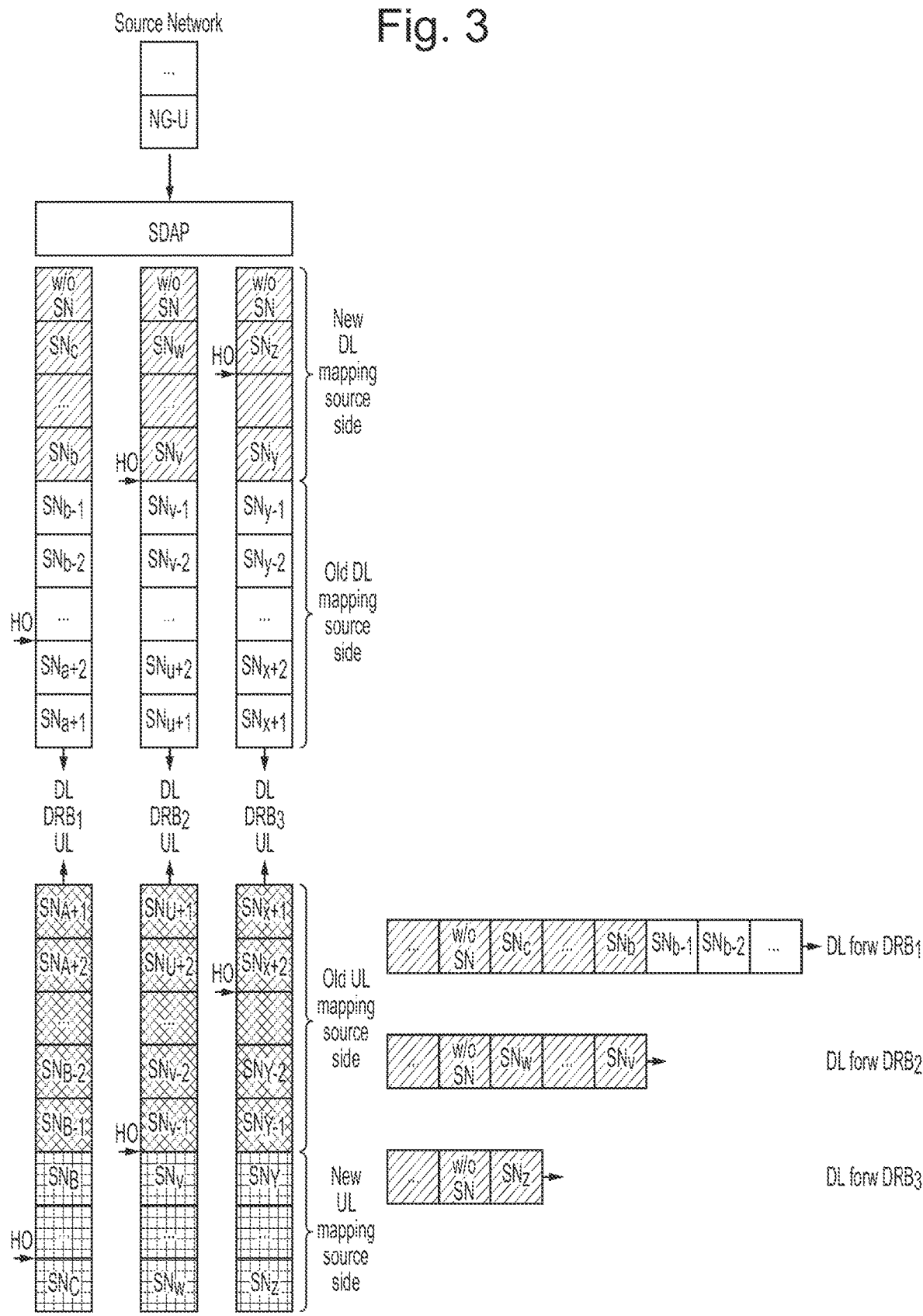
FIG. 3 is a diagram showing scenarios wherein a procedure for remapping is initiated in the source NG-RAN node before handover.

Uplink handling:
  Data forwarding of UL packets to the target side occurs when packets are missing on the source side. If this is the case, UL packets with PDCP SN are forwarded to the target node. FIG. 3 shows two interesting cases for DRB1 and DRB2, where on the target side remapping would occur as well. Packets for a QoS flow and later-on an SDAP end marker PDU for that QoS flow could be received on a DRB by the target NG-RAN node, from which the target node would not expect such to happen, as the target is unaware of the ongoing remapping at the source side. In other words, the target may receive UL packets for a given QoS flow on a different DRB than expected. This may cause problems in certain implementations, e.g. the target node may decide to release the DRB assuming misbehavior from the UE side.
  To solve this problem: (1) the source NG-RAN node should inform the target NG-RAN that a remapping is ongoing in the source side; (2) the source NG-RAN node should provide to the target NG-RAN node both the old and the new mapping, so that the target NG-RAN node is prepared to receive the SDAP headers from the UE.

Aspects of embodiments provide mechanisms that allows the source NG-RAN node to inform the target NG-RAN that a remapping is ongoing in the source while the handover preparation is performed.

There are, proposed herein, various embodiments which address one or more of the issues disclosed herein. According to certain embodiments, a method performed by a network node is disclosed. The network node initiates a QoS-flow to DRB remapping. The network node informs a target network node that the remapping is ongoing. The network node also provides the target network node an old and a new QoS-flow to DRB mappings, wherein the old mapping was in place before the remapping, and the new mapping will be in place after the remapping. This may enable the target network node to receive SDAP headers from a UE.

According to certain embodiments, a method performed by a target network node is disclosed. After a source network node initiates a QoS-flow to DRB remapping, the target network node receives, from the source network node, and indication that the remapping is ongoing. The target network node also receives, from the source network node, an old and a new QoS-flow to DRB mappings, wherein the old mapping was in place before the remapping, and the new mapping will be in place after the remapping. This may enable the target network node to receive SDAP headers from a UE.

According to certain embodiments, a network node is disclosed. The network node comprises processing circuitry (and any other necessary hardware) configured to perform any of the methods discussed above.

According to certain embodiments, UEs and methods performed by UEs are also disclosed, as will be discussed in more detail below.

Certain embodiments may provide one or more of the following technical advantages. For instance, the proposed mechanism supports the scenario where the handover preparation is performed while a QoS-flow to DRB remapping is performed in the source node. This ensures the target node will receive UL packets for a given QoS flow on an expected DRB. This prevents the target node from assuming an error from the UE and releasing the DRB.

Additional technical advantages may be readily apparent to those of skill in the art in light of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As explained above, the scenario described FIG. 3 can be supported in DL without the need of impacting existing specifications. On the other hand, for correct UL handling, the source NG-RAN node needs to inform the target NG-RAN node about the fact that remapping is ongoing and about the old and new mapping. This can be done for example by adding a new SN Status Transfer message in the Xn interface, as discussed below.

SN Status Transfer

According to certain embodiments, this message is sent by an appropriate network node (e.g., the source NG-RAN node) to another appropriate network node (e.g., the target NG-RAN node) to transfer the uplink/downlink PDCP SN and HFN status during a handover or for dual connectivity.

Direction: source NG-RAN node→target NG-RAN node (handover),

NG-RAN node from which the DRB context is transferred→NG-RAN node to which the DRB context is transferred (dual connectivity).

According to certain embodiments, the proposed solution could be implemented with the proposed change to 3GPP TS 38.423 shown in Table 1 below. However, it will be appreciated that this is for illustrative purposes only, and other changes or terminologies may be used, either in TS 38.423 or in other specifications, without departing from the scope of this disclosure or the functionality described herein.

TABLE 1

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| Source NG-RAN node UE XnAP ID | M | | NG-RAN node UE XnAP ID 9.2.3.16 | Allocated for handover at the source NG-RAN node and for dual connectivity at the NG-RAN node from which the DRB context is transferred. | YES | reject |
| Target NG-RAN node UE XnAP ID | M | | NG-RAN node UE XnAP ID 9.2.3.16 | Allocated for handover at the target NG-RAN node and for dual connectivity at the NG-RAN node to which the DRB context is transferred. | YES | reject |
| DRBs Subject To Status Transfer List | M | | 9.2.1.14 | | YES | ignore |
| Old Source DRB to QoS Flow Mapping List-UL end markers expected | O | | DRB to QoS Flow Mapping List 9.2.1.15 | This IE is included to be used for indicating that QoS flow re-mapping is still on going on the source NG-RAN node. It shall only contain UL flow mapping for QoS flows for which no SDAP end marker was yet received on the source side. | — | |

The part with bold underlined text is introduced as part of this disclosure.

In case that the target node is split into CU-CP and CU-UP (as per the architecture described in TS 38.401) this information needs to be propagated also on the E1 interface. This can be done by adding an Old Flow Mapping Information-UL end marker expected IE in the Bearer Context Setup Request message in TS 38.463. Similarly, for handling this scenario in case of an NG handover, a similar IE should also be introduced over the NG interface.

The purpose of the SN Status Transfer procedure is to transfer the uplink PDCP SN and HFN receiver status and the downlink PDCP SN and HFN transmitter status either, from the source to the target NG-RAN node during an Xn handover, or between the NG-RAN nodes involved in dual connectivity, for each respective DRB of the source DRB configuration for which PDCP SN and HFN status preservation applies.

Where aspects of embodiments are discussed in the context of handovers, if the SN Status Transfer procedure is applied in the course of dual connectivity in the subsequent specification text, the the terminology used should be interpreted as follows:

the behaviour of the NG-RAN node from which the DRB context is transferred, i.e. the NG-RAN node involved in dual connectivity from data forwarding, is specified by the behaviour of the "source NG-RAN node", the behaviour of the NG-RAN node to which the DRB context is transferred, i.e., the NG-RAN node involved in dual connectivity to which data is forwarded, is specified by the behaviour of the "target NG-RAN node".

In aspects of embodiments, the procedure uses UE-associated signalling. TS 38.423 may be amended as discussed below:

8.2.2.2 Successful Operation

Figure 3A:
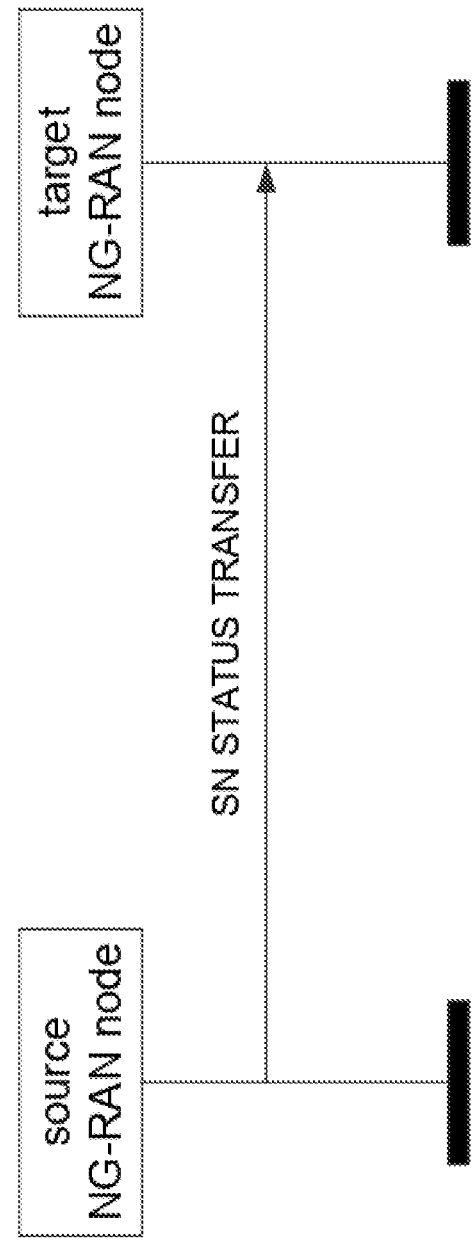
FIG. 3A is a diagram showing a successful SN Status Transfer operation.

In a SN status transfer operation according to an aspect of an embodiment, as shown in FIG. 3A, the source NG-RAN node initiates the procedure by stop assigning PDCP SNs to downlink SDUs and stop delivering UL SDUs towards the 5GC and sending the SN STATUS TRANSFER message to the target NG-RAN node at the time point when it considers the transmitter/receiver status to be frozen. The target NG-RAN node using full configuration for this handover as per TS 38.300 [9] shall ignore the information received in this message.

For each DRB for which PDCP-SN and HFN status preservation applies, the source NG-RAN node shall include the DRB ID IE, the UL COUNT Value IE and the DL COUNT Value IE within the DRBs Subject to Status Transfer List IE in the SN STATUS TRANSFER message.

The source NG-RAN node may also include in the SN STATUS TRANSFER message the missing and the received uplink SDUs in the Receive Status of UL PDCP SDUs IE for each DRB for which the source NG-RAN node has accepted the request from the target NG-RAN node for uplink forwarding.

For each DRB in the DRBs Subject to Status Transfer List IE, the target NG-RAN node shall not deliver any uplink packet which has a PDCP-SN lower than the value contained within the UL Count Value IE.

For each DRB in the DRBs Subject to Status Transfer List IE, the target NG-RAN node shall use the value of the PDCP SN contained within the DL COUNT Value IE for the first downlink packet for which there is no PDCP-SN yet assigned.

If the Receive Status of UL PDCP SDUs IE is included for at least one DRB in the SN STATUS TRANSFER message, the target NG-RAN node may use it in a Status Report message sent to the UE over the radio interface.

8.2.2.3 Unsuccessful Operation

Not applicable.

8.2.2.4 Abnormal Conditions

If the target NG-RAN node receives this message for a UE for which no prepared handover exists at the target NGRAN node, the target NG-RAN node shall ignore the message.

Figure 4:
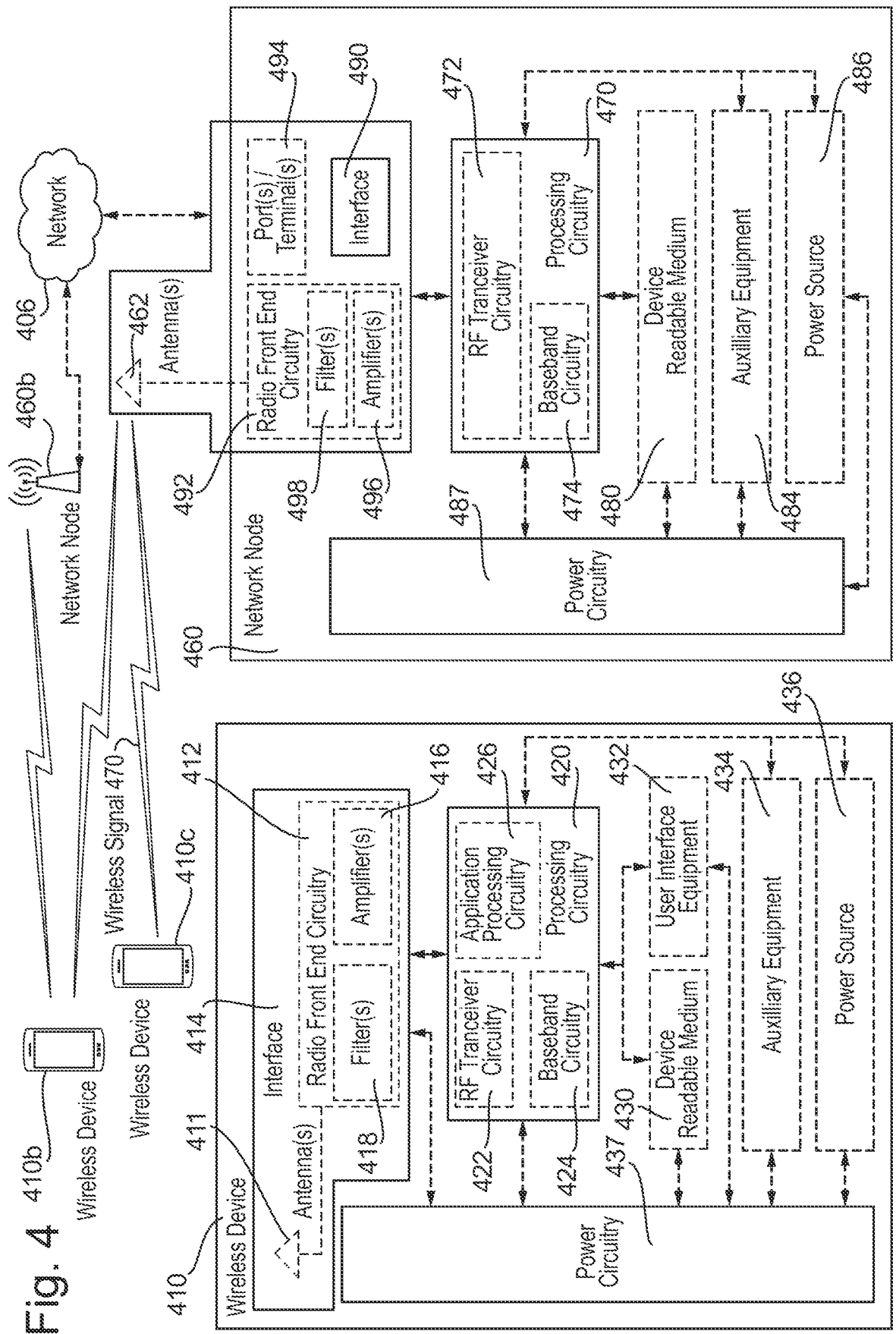
FIG. 4 is a diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SM LCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
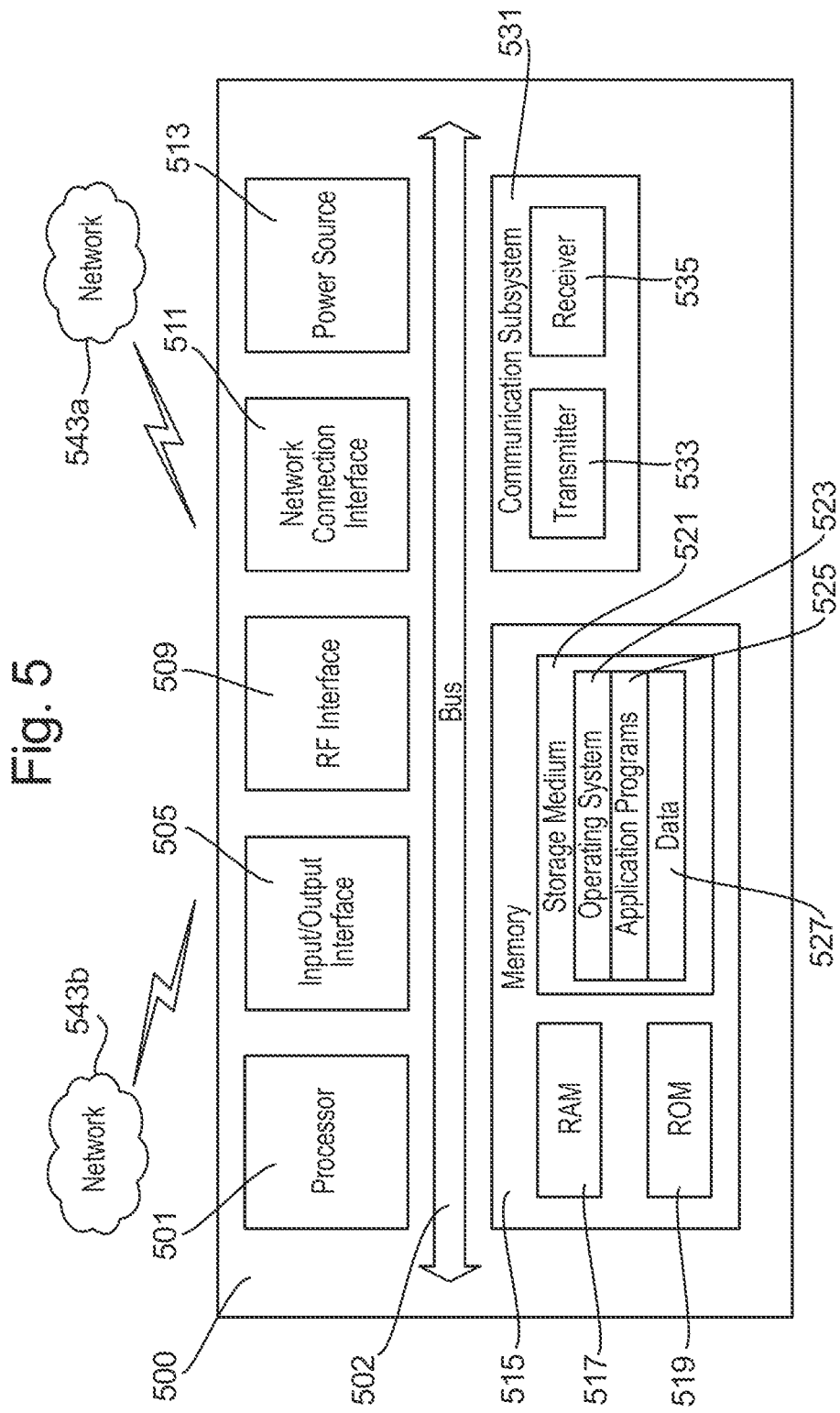
FIG. 5 is a diagram of a user equipment in accordance with some embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3$^{rd}$ Generation Partnership Project (3GPP), including a NB-IoT UE that is not intended for sale to, or operation by, a human user. UE 500, as illustrated in FIG. 5, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
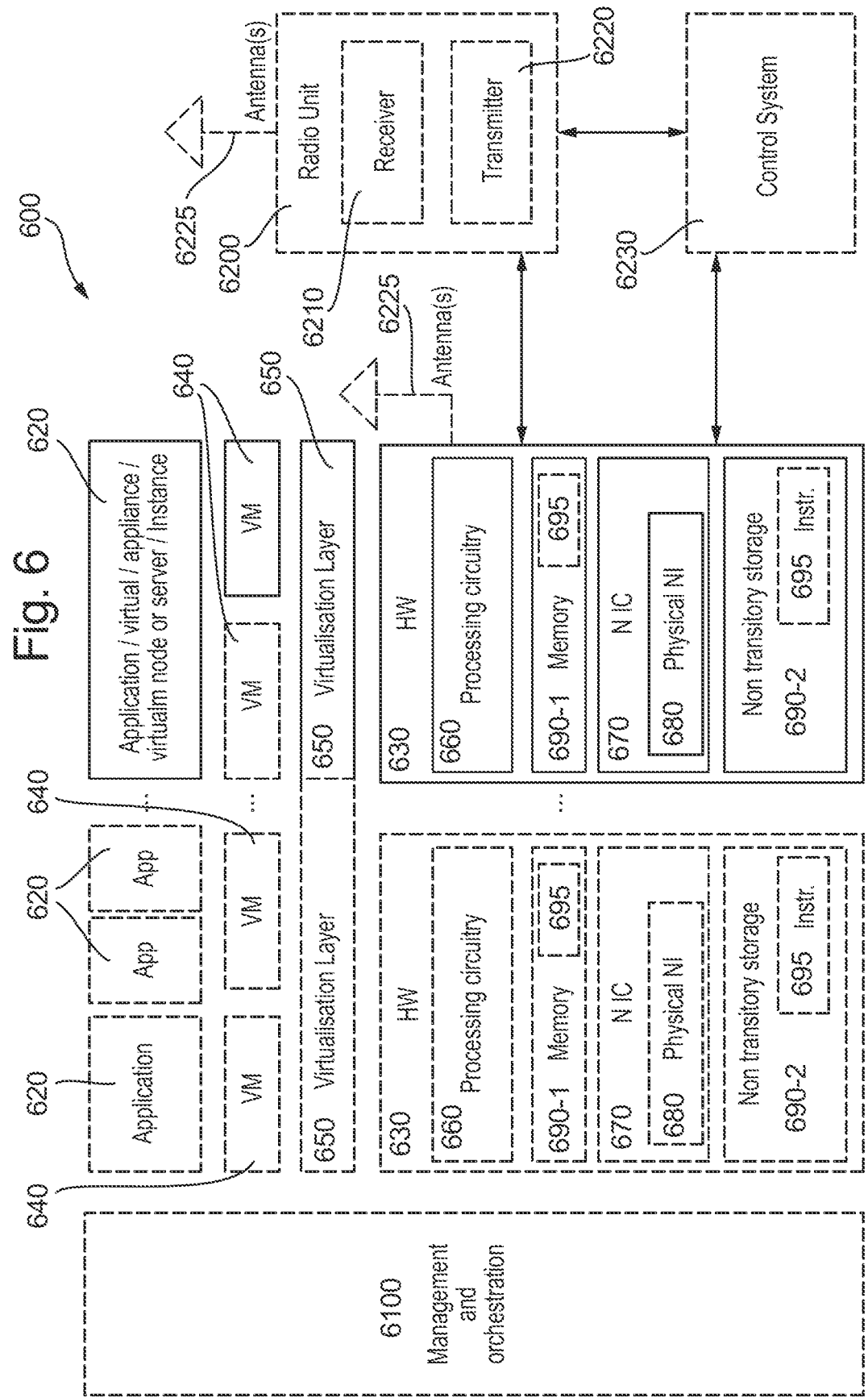
FIG. 6 is a diagram of a virtualization environment in accordance with some embodiments.

FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signalling can be effected with the use of control system 6230 which may alternatively be used for communication between the hardware nodes 630 and radio units 6200.

Figure 7:
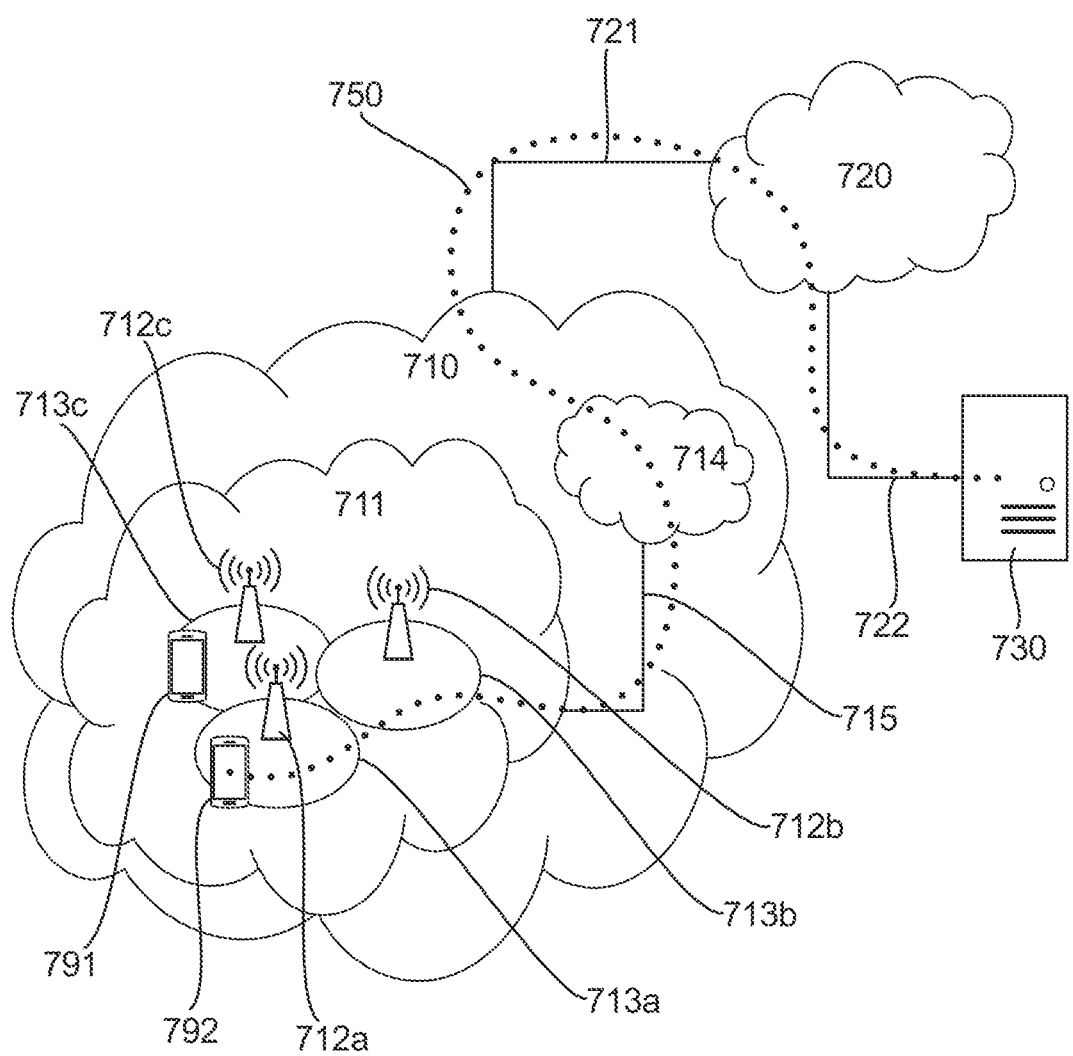
FIG. 7 is a diagram of a telecommunication network connected via an intermediate network to a host computer in accordance with some embodiments.

With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

Figure 8:
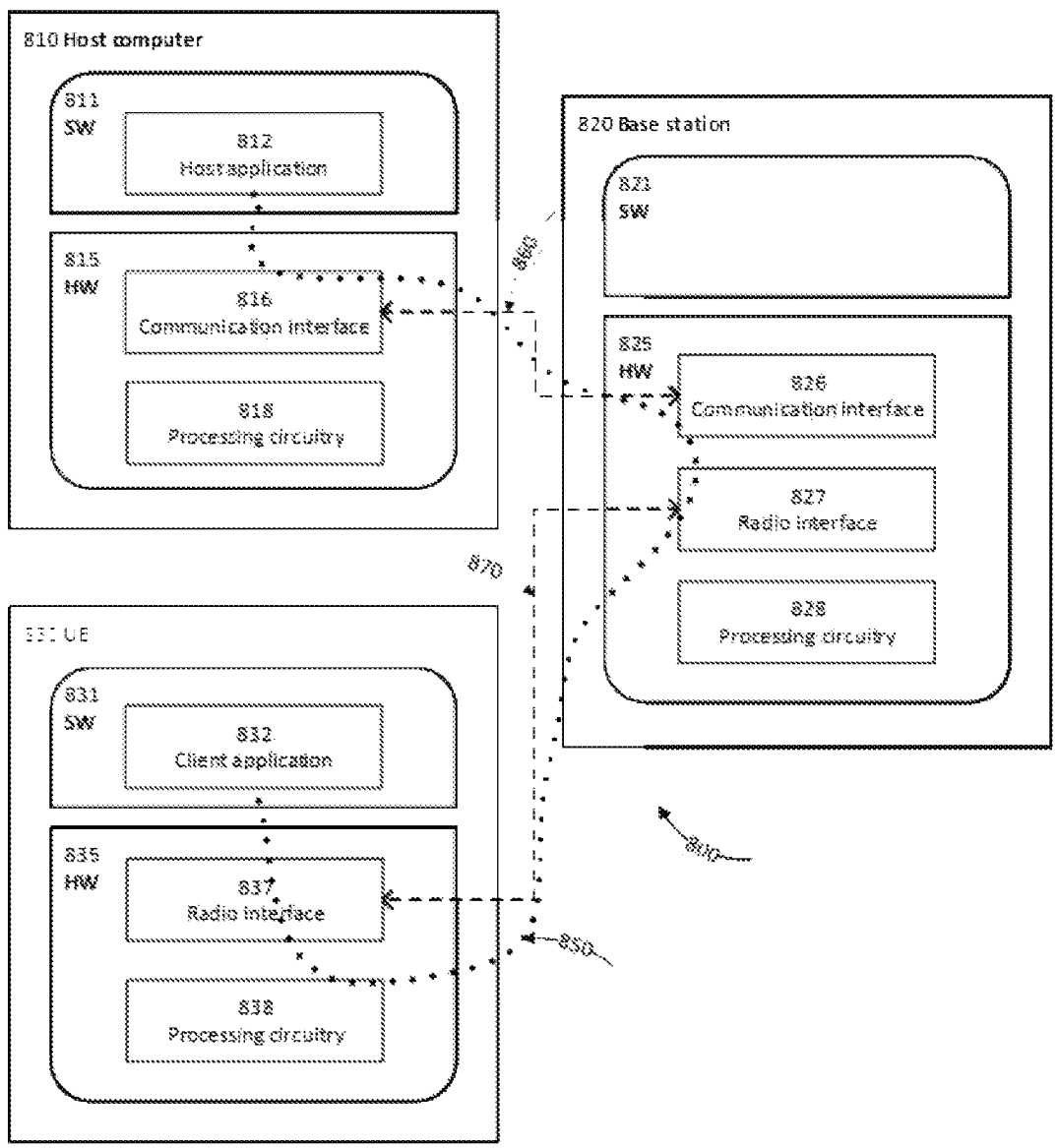
FIG. 8 is a diagram of a host computer communicating via a base station with a user equipment over a partially wireless connection in accordance with some embodiments.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the data rate and latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
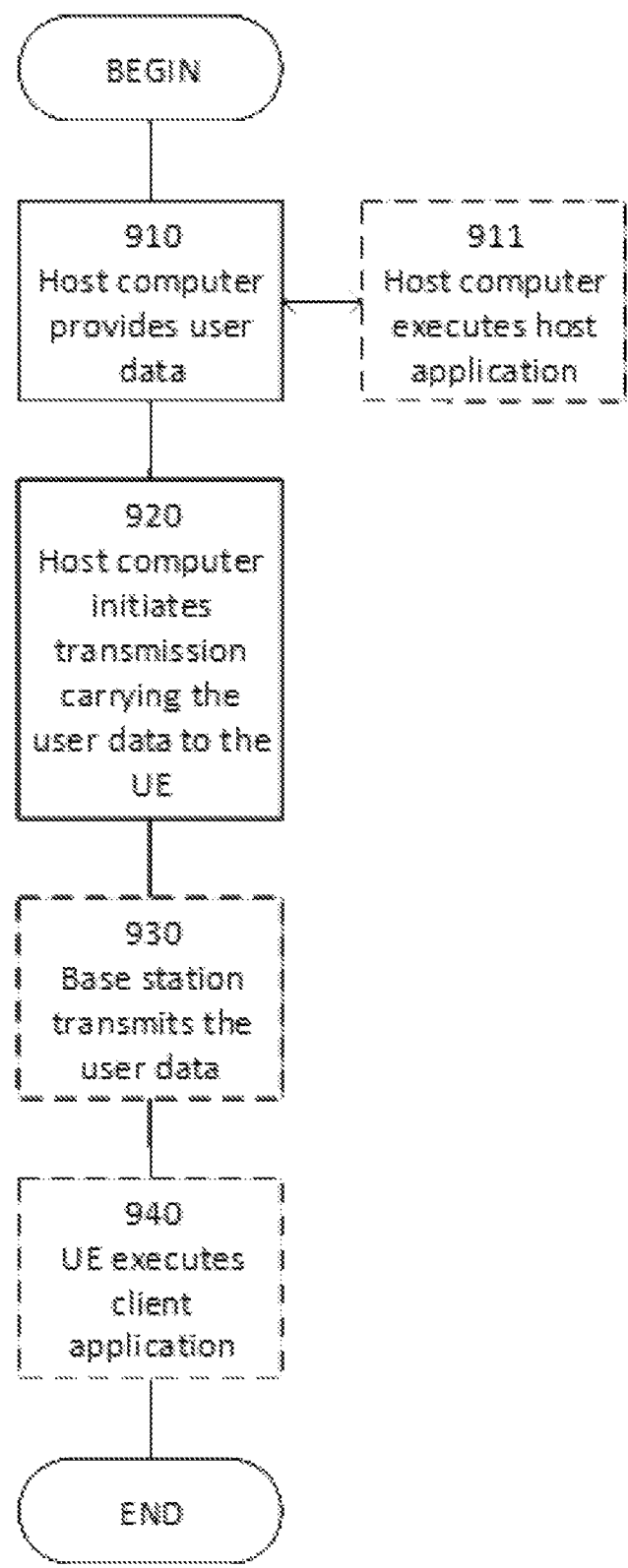
FIG. 9 is a flowchart showing methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
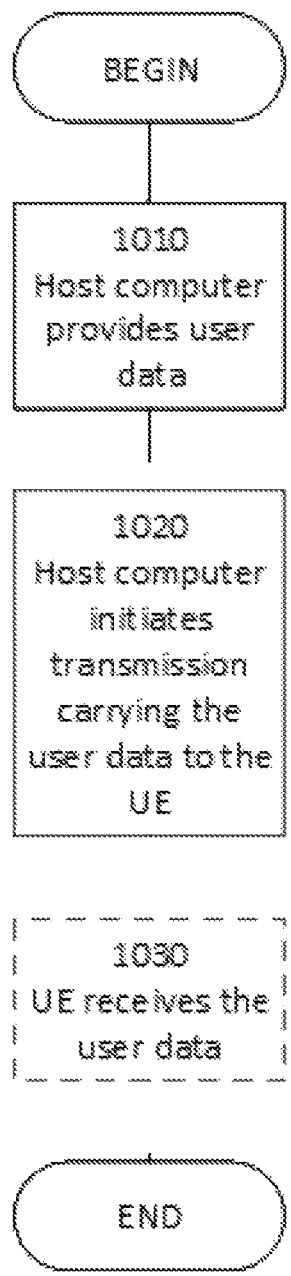
FIG. 10 is a flowchart showing further methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
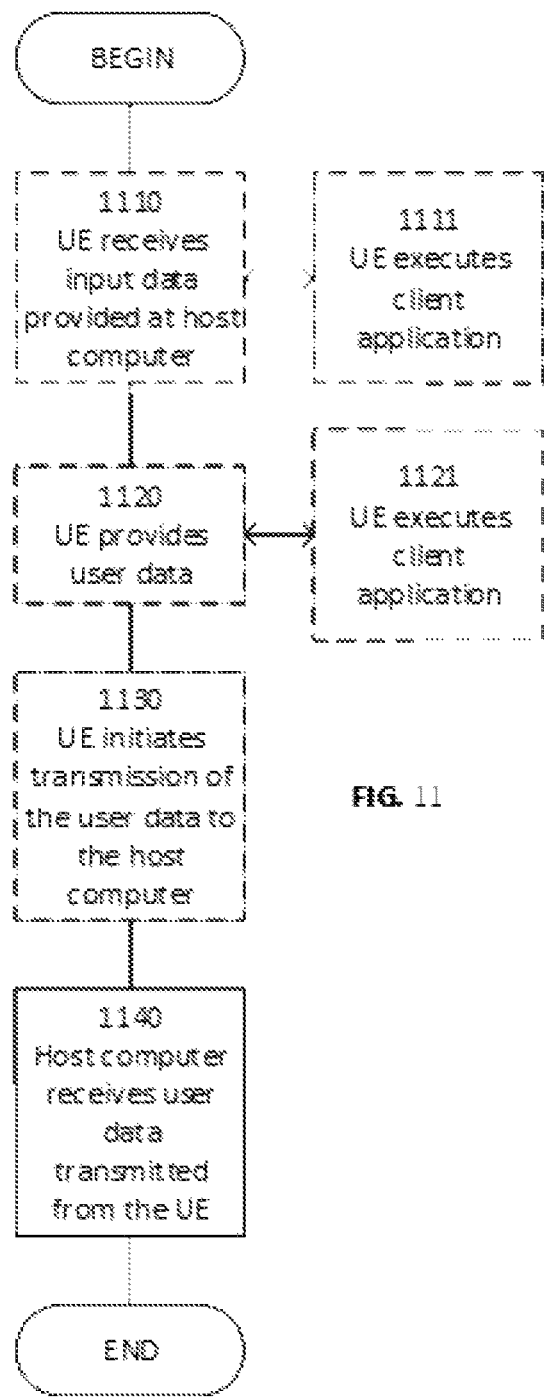
FIG. 11 is a flowchart showing still further methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
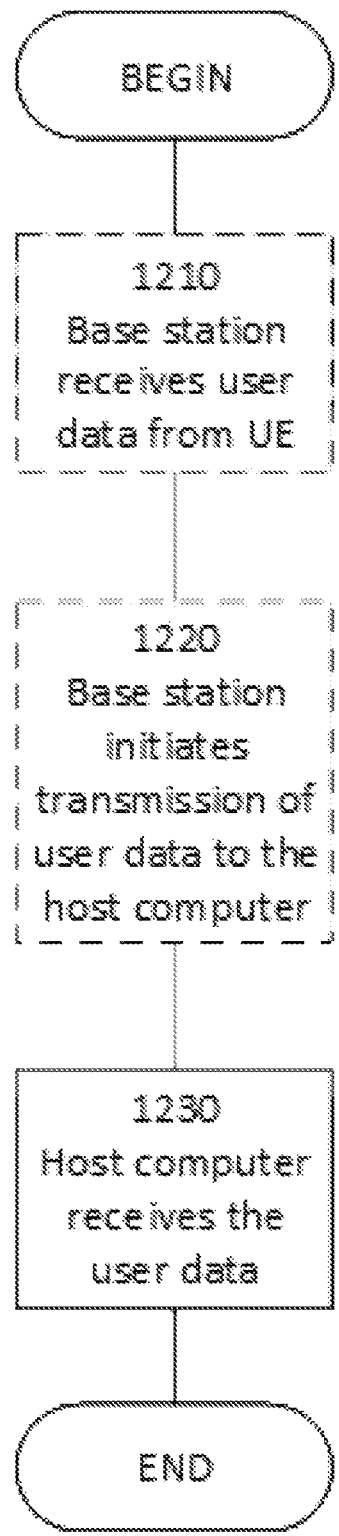
FIG. 12 is a flowchart showing yet further methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The following numbered statements provide additional information on certain aspects of embodiments:

1. A method performed by a wireless device, the method comprising:
   Sending data packets using a first QoS-flow to DRB mapping;
   Receiving a new mapping;
   Sending an SDAP end marker, indicating that the wireless device is applying the new mapping.
2. The method of statement 1, further comprising:
   providing user data; and
   forwarding the user data to a host computer via the transmission to the base station.
3. A method performed by a base station, the method comprising:
   Initiating a QoS-flow to DRB remapping;
   Informing a target base station that the remapping is ongoing; and
   Providing the target base station an old and a new QoS-flow to DRB mapping, wherein the old mapping was in place before the remapping, and the new mapping will be in place after the remapping.
4. The method of statement 3, wherein the base station is a source NG-RAN node, and wherein the target base station is a target NG-RAN node for handover.
5. The method of statement 3, wherein the base station is an NG-RAN node from which DRB context is transferred, and wherein the target base station is a NG-RAN node to which the DRB context is transferred in dual connectivity.
6. The method of any of the previous statements, further comprising:
   obtaining user data; and
   forwarding the user data to a host computer or a wireless device.
7. A wireless device, the wireless device comprising:
   processing circuitry configured to perform any of the steps of statements 1 and 2; and
   power supply circuitry configured to supply power to the wireless device.
8. A base station, the base station comprising:
   processing circuitry configured to perform any of the steps of statements 3 to 6; and
   power supply circuitry configured to supply power to the wireless device.
9. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of statements 1 and 2;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
10. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of statements 3 to 6.
11. The communication system of statement 10 further including the base station.
12. The communication system of any of statements 10 and 11, further including the UE, wherein the UE is configured to communicate with the base station.
13. The communication system of any of statements 10 to 12, wherein:
    the processing circuitry of the host computer is configured to execute a host application, thereby providing the user data; and
    the UE comprises processing circuitry configured to execute a client application associated with the host application.
14. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of statements 3 to 6.
15. The method of statement 14, further comprising, at the base station, transmitting the user data.
16. The method of any of statements 14 and 15, wherein the user data is provided at the host computer by executing a host application, the method further comprising, at the UE, executing a client application associated with the host application.
17. A user equipment (UE) configured to communicate with a base station, the UE comprising a radio interface and processing circuitry configured to performs the steps of any of statements 14 to 16.
18. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of statements 1 and 2.
19. The communication system of statement 18, wherein the cellular network further includes a base station configured to communicate with the UE.

20. The communication system of any of statements 18 and 19, wherein:
the processing circuitry of the host computer is configured to execute a host application, thereby providing the user data; and
the UE's processing circuitry is configured to execute a client application associated with the host application.

21. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of statements 1 and 2.

22. The method of statement 21, further comprising at the UE, receiving the user data from the base station.

23. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any statements 1 and 2.

24. The communication system of statement 23, further including the UE.

25. The communication system of any of statements 23 and 24, further including the base station, wherein the base station comprises a radio interface configured to communicate with the UE and a communication interface configured to forward to the host computer the user data carried by a transmission from the UE to the base station.

26. The communication system of any of statements 23 to 25, wherein:
the processing circuitry of the host computer is configured to execute a host application; and
the UE's processing circuitry is configured to execute a client application associated with the host application, thereby providing the user data.

27. The communication system of any of statements 23 to 26, wherein:
the processing circuitry of the host computer is configured to execute a host application, thereby providing request data; and
the UE's processing circuitry is configured to execute a client application associated with the host application, thereby providing the user data in 28. A method implemented in a communication system including a host computer, a base station and a user equipment (UE), the method comprising:
at the host computer, receiving user data transmitted to the base station from the UE, wherein the UE performs any of the steps of any of statements 1 and 2.

29. The method of statement 28, further comprising, at the UE, providing the user data to the base station.

30. The method of any of statements 28 and 29, further comprising:
at the UE, executing a client application, thereby providing the user data to be transmitted; and
at the host computer, executing a host application associated with the client application.

31. The method of any of statements 28 to 30, further comprising:
at the UE, executing a client application; and
at the UE, receiving input data to the client application, the input data being provided at the host computer by executing a host application associated with the client application,
wherein the user data to be transmitted is provided by the client application in response to the input data.

32. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of statements 3 to 6.

33. The communication system of statement 32 further including the base station.

34. The communication system of any of statements 32 and 33, further including the UE, wherein the UE is configured to communicate with the base station.

35. The communication system of any of statements 32 to 34, wherein:
the processing circuitry of the host computer is configured to execute a host application;
the UE is configured to execute a client application associated with the host application, thereby providing the user data to be received by the host computer.

36. A method implemented in a communication system including a host computer, a base station and a user equipment (UE), the method comprising:
at the host computer, receiving, from the base station, user data originating from a transmission which the base station has received from the UE, wherein the UE performs any of the steps of any of statements 1 and 2.

37. The method of statement 36, further comprising at the base station, receiving the user data from the UE.

38. The method of any of statements 36 and 37, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in LTE)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTELong-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a source base station, the method comprising:
   initiating a Quality of Service-flow (QoS-flow) to Data Resource Bearer (DRB) remapping;
   providing a target base station with one or more new QoS-flow to DRB mappings; and
   sending the target base station a Sequence Number (SN) status transfer message, the SN status transfer message comprising a list of DRBs subject to status transfer, the list of DRBs subject to the status transfer indicating one or more old QoS-flow to DRB mappings,
   wherein the list of DRBs subject to the status transfer includes a QoS flow mapping list that indicates one or more uplink (UL) QoS flows for which the source base station has initiated the QoS flow to DRB remapping and a Service Data Adaptation Protocol (SDAP) end marker has not been received at the source base station.

2. The method of claim 1, wherein the QoS-flow to DRB remapping is ongoing when a handover from the source base station to the target base station is triggered.

3. The method of claim 1, wherein the list of DRBs subject to the status transfer comprises a DRB Identity (DRB ID) and at least one of an Uplink (UL) count value and a Downlink (DL) count value.

4. The method of claim 1, wherein:
the list of DRBs subject to the status transfer comprises a DRB Identity (DRB ID) and an Uplink (UL) count value associated with the DRB ID; and
with respect to a DRB identified by the DRB ID, the target base station does not deliver any uplink packet having a Packet Data Convergence Protocol Sequence Number (PDCP-SN) lower than a value contained within the UL count value associated with the DRB ID.

5. The method of claim 1 wherein, when the source base station has accepted a request for uplink forwarding from the target base station in relation to a DRB, the SN status transfer message comprises a list of missing and received uplink Service Data Units (SDUs) for that DRB.

6. The method of claim 1, wherein the source base station is a node from which DRB context is transferred, and wherein the target base station is a node to which the DRB context is transferred in dual connectivity.

7. The method of claim 6, wherein the method is performed when the QoS-flow to DRB remapping is ongoing when the DRB context transfer is triggered.

8. The method of claim 1, wherein the one or more old QoS-flow to DRB mappings and the one or more new QoS-flow to DRB mappings enable the target base station to receive Service Data Adaptation Protocol (SDAP) headers from a wireless device.

9. The method of claim 1, wherein:
the list of DRBs subject to the status transfer comprises a DRB Identity (DRB ID) and a Downlink (DL) count value associated with the DRB ID; and
with respect to a DRB identified by the DRB ID, the target base station node uses a value of a Packet Data Convergence Protocol Sequence Number (PDCP-SN) from the DL count value for the first downlink packet for which no PDCP-SN has previously been assigned.

10. The method of claim 1, wherein the source base station is a source Next Generation Radio Access Network (NG-RAN) node and the target base station is a target NG-RAN node for handover.

11. A source base station comprising:
processing circuitry configured to perform the steps of:
i. initiating a Quality of Service-flow (QoS-flow) to Data Radio Bearer (DRB) remapping;
ii. providing a target base station with one or more new QoS-flow to DRB mappings; and
iii. sending the target base station a Sequence Number (SN) status transfer message, the SN status transfer message comprising a list of DRBs subject to status transfer, the list of DRBs subject to the status transfer indicating one or more old QoS-flow to DRB mappings,
wherein the list of DRBs subject to the status transfer includes a QoS flow mapping list that indicates one or more uplink (UL) QoS flows for which the source base station has initiated the QoS flow to DRB remapping and a Service Data Adaptation Protocol (SDAP) end marker has not been received at the source base station,
power supply circuitry configured to supply power to the source base station.

* * * * *

UNITED STATES PATENT AND TRADEMARK OFFICE
CERTIFICATE OF CORRECTION

PATENT NO. : 12,004,002 B2
APPLICATION NO. : 17/289556
DATED : June 4, 2024
INVENTOR(S) : Fiorani et al.

Page 1 of 2

It is certified that error appears in the above-identified patent and that said Letters Patent is hereby corrected as shown below:

On the Title Page

On Page 2, in Item (56), under "OTHER PUBLICATIONS", in Column 2, Line 18, delete "ChenQdu," and insert -- Chengdu, --, therefor.

In the Specification

In Column 20, Line 42, delete "interchangeable." and insert -- interchangeably. --, therefor.

In Column 31, Line 53, delete "data in" and insert -- data in response to the request data. --, therefor.

In Column 32, Line 59, delete "Carrier Component" and insert -- Component Carrier --, therefor.

In Column 32, Line 61, delete "Multiplexing" and insert -- Multiple --, therefor.

In Column 32, Line 62, delete "Identifier" and insert -- Identity --, therefor.

In Column 33, Line 1, delete "information" and insert -- Indicator --, therefor.

In Column 33, Line 13, delete "E-SMLC Evolved-Serving Mobile Location Centre".

In Column 33, Line 32, delete "LTELong-Term" and insert -- LTE Long-Term --, therefor.

In Column 33, Line 56, delete "Profile" and insert -- Power --, therefor.

In Column 33, Line 58, delete "Packet Gateway" and insert -- Packet Data Network Gateway --, therefor.

In Column 33, Line 61, delete "Precoder" and insert -- Precoding --, therefor.

Signed and Sealed this
Fifth Day of November, 2024

Katherine Kelly Vidal
*Director of the United States Patent and Trademark Office*

CERTIFICATE OF CORRECTION (continued)
U.S. Pat. No. 12,004,002 B2

In Column 34, Line 4, delete "Management" and insert -- Monitoring --, therefor.

In Column 34, Line 25, delete "Self Optimized" and insert -- Self-Organizing --, therefor.

In Column 34, Line 40, delete "Wide" and insert -- Wideband --, therefor.

In Column 34, Line 41, delete "Wide" and insert -- Wireless --, therefor.